United States Patent [19]
Bettendorf

[11] Patent Number: 4,736,146
[45] Date of Patent: Apr. 5, 1988

[54] RUN AND BRAKE CONTROL CIRCUIT

[75] Inventor: Richard A. Bettendorf, Oklahoma City, Okla.

[73] Assignee: BancTec, Inc., Oklahoma City, Okla.

[21] Appl. No.: 885,095

[22] Filed: Jul. 14, 1986

[51] Int. Cl.⁴ ............................................. H02P 3/24
[52] U.S. Cl. ..................................... 318/762; 318/760
[58] Field of Search ........................ 318/760, 761, 762

[56] References Cited

U.S. PATENT DOCUMENTS

| | | | |
|---|---|---|---|
| 3,753,061 | 8/1973 | Owens | 318/762 |
| 3,805,133 | 4/1974 | Hatekeyama et al. | 318/761 |
| 4,181,197 | 1/1980 | Tanabe et al. | 318/762 |
| 4,334,181 | 6/1982 | Schroeder | 318/760 |
| 4,560,913 | 12/1985 | Min | 318/760 |
| 4,612,490 | 9/1986 | Kagi | 318/760 |

*Primary Examiner*—David Smith, Jr.
*Attorney, Agent, or Firm*—Bill D. McCarthy

[57] ABSTRACT

An electric motor run and brake control circuit for controlling alternating current to a three-phase motor in which the circuit is operated by a single logic level input signal. When the input signal is low, a run relay is closed and AC power is applied to the motor. When the input signal goes high, the run relay is opened and the motor is braked for a fast stop. A brake capacitor and charge resistor limit both the time during which braking current is applied and the repetition rate of braking cycles.

5 Claims, 1 Drawing Sheet

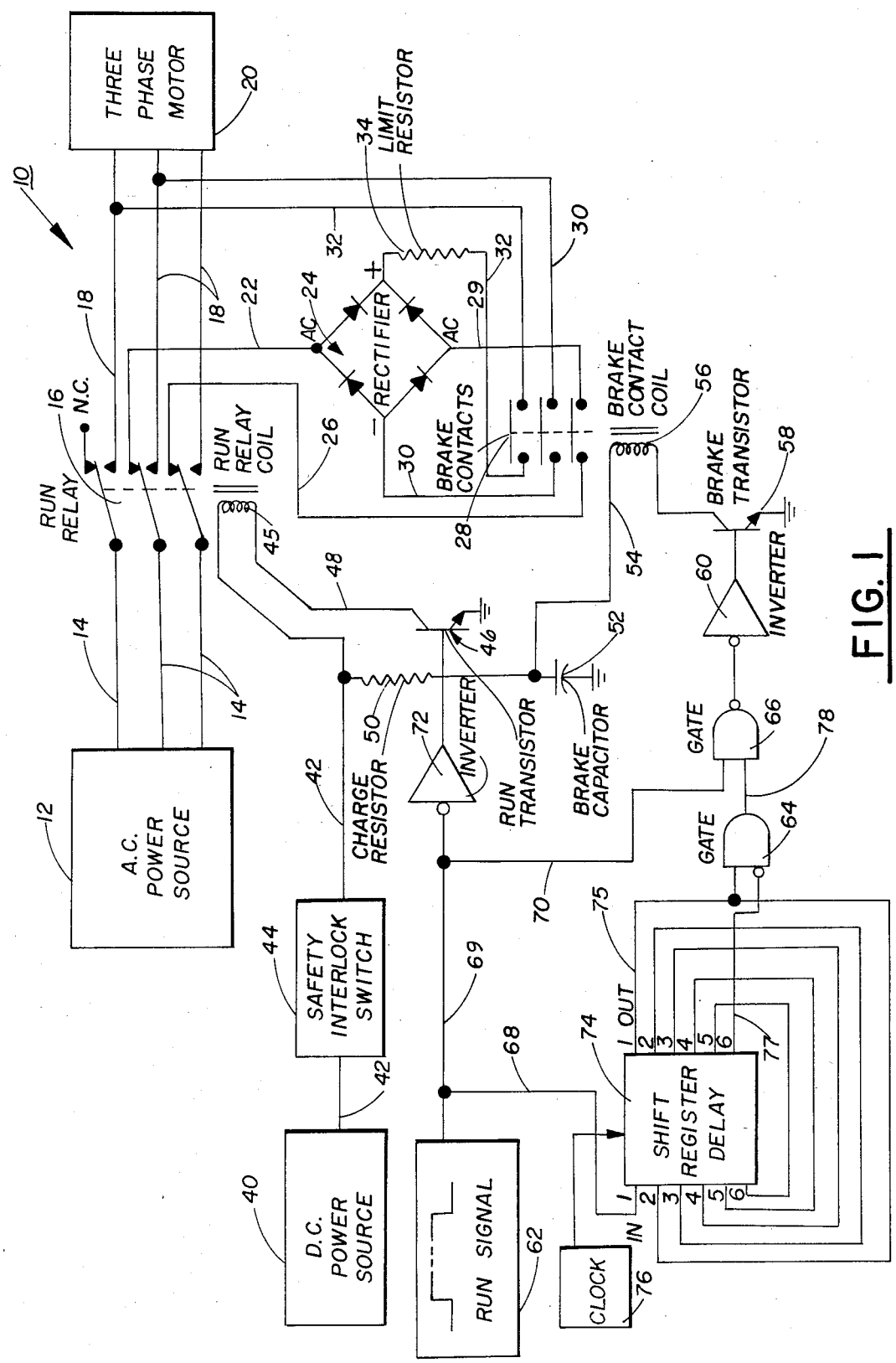

4,736,146

RUN AND BRAKE CONTROL CIRCUIT

BACKGROUND OF THE INVENTION

This invention relates to a run and brake control circuit and more particularly, but not by way of limitation, to an electruc run and brake control circuit for a three-phase motor operated by alternating current and using a single logic level input. The signal when low, closes a run relay applying AC power to the motor. When the signal goes high, the run relay is opened and the motor is braked using DC current for a fast stop.

Heretofore, large and expensive alternating current motors were used in modern business equipment along with braking systems that required complex circuitry for braking the motors when a fast stop was required. The subject invention eliminates this problem by reducing the size and cost of the components in the braking circuitry and greatly simplifying the necessary circuit system.

SUMMARY OF THE INVENTION

The subject circuit uses a minimum number of parts for greater reliability and reduced size. Also the circuit uses smaller and lower cost parts to satisfy space and cost limitations.

The use of a capacitor to energize a brake contact limits the time the contact can apply heavy braking current if a logic failure occurs. This limitation of frequency to the brake cycle protects the motor.

DC current to an inductive load on a motor is difficult to control due to arcing. The subject invention overcomes this problem by using a third pole of the brake contact to switch the AC current to a bridge rectifier. This limits arcing to a portion of the AC cycle and allows the brake contact to meet UL and CSA requirements as a primary motor control component.

Further, the damaging of a motor in case of a logic failure in which the brake contact is turned on is solved by limiting the time the contact can be closed through the use of the size of the capacitor. A charge resistor and the capacitor limit both the time and repetition rates of the brake cycle.

Also, the method of controlling the AC and DC power allows the subject circuit to meet all of the requirements of safety agencies such as UL, CSA and VDE.

The motor run and brake control circuit includes a run relay and brake contact using low voltage coils with provisions to completely disable a three-phase motor by interrupting the coil power with a safety interlock switch. A low level input run signal energizes the run relay to drive the motor. When the input signal goes high, the run relay is immediately opened and an "and" gate to a brake transistor is allowed. A shift register delay however inhibits the "and" gate for a short time to insure the run relay is opened and settled. The shift register delay then satisfies the "and" gate condition to energize a brake contact for a fixed time to apply heavy DC current through a bridge rectifier to the motor thus bringing the motor to a rapid stop. After one cycle of the shift register, the brake transistor is inhibited, and the brake contactor is opened removing both the AC current to the rectifier and the DC power to the motor. This cycle cannot be repeated until the run signal has gone high again and then to low.

The advantages and objects of the invention will become evident from the following detailed description of the drawings when read in connection with the accompanying drawings which illustrate preferred embodiments of the invention.

BRIEF DESCRIPTION OF THE DRAWINGS

FIG. 1 illustrates a schematic drawing of the subject motor control circuit.

DETAILED DESCRIPTION OF THE DRAWINGS

In FIG. 1 the subject AC motor run and brake control circuit is designated by general reference numeral 10. The circuit 10 includes AC power source 12 which, through leads 14, provides current through a run relay 16. In FIG. 1 the run relay 16 is shown in an open position. When this run relay 16 is closed alternating current is applied through leads 18 to a three-phase motor 20.

When the run relay 16 is open as shown, alternating current is applied through a lead 22 to an AC pole of a rectifier 24. Also, via a lead 26, power is applied through a brake contact 28 to another AC pole of the rectifier 24. The brake contact 28 in FIG. 1 is shown in an open position. When the contact 28 is closed, the lead 26 is connected to the other AC pole of the rectifier 24 so that the alternating current applied to the rectifier 24 is converted to direct current. When the brake contact 28 is closed, the direct current is applied from the rectifier 24 through leads 30 and 32 to the three-phase motor 20 for applying a single phase current thereto for the rapid stopping or braking of the motor 20. The lead 32 includes a limit resistor 34 to limit the current to a safe value.

On the left hand side of the circuit 10 a DC power source 40 is provided for applying direct current through a lead 42 to a safety interlock switch 44. The safety interlock switch 44 provides a necessary safety feature for disabling the circuit 10 when a door or panel is opened allowing access to a mechanically hazardous area. The lead 42 is connected to a run relay coil 45 which is used for closing the run relay 16 when DC current flows through the run relay coil 45 by turning on the run transistor 46 via a lead 48. Also connected to the lead 42 is a charge resistor 50 and a brake coil energizing brake capacitor 52 which are connected via a lead 54 to a brake contact coil 56 which is used for closing the three pole brake contact 28 when a brake transistor 58 is turned on by an inverter 60.

A logic level run signal 62 provides a high and low signal source to the circuit 10. The run signal 62 is connected to a first "and" gate 64 through lead 68 and the first channel of a shift register delay 74 and to a second "and" gate 66 via leads 69 and 70. The run signal also is connected to the run inverter 72 via lead 69 and drives the run transistor 46 which energizes the run relay coil 45 via lead 48, when the run signal is at a low logic level. Connected between the input run signal and second "and" gate 66 is the shift register delay circuit 74. This shift register delay circuit 74 has six delay channels, the delay time determined by a clock 76. The first input of the shift register delay circuit 74 is connected to the run signal 62 via lead 68 and each output is wrapped back to the next input to present a total of six delay periods at the last output.

In operation when the run signal 62 provides a low level signal the run relay coil 45 is energized and the run relay 16 is closed for applying alternating current to the three-phase motor 20. When the signal from the run signal source 62 goes high the run relay 16 is immediately opened and the second "and" gate 66 is "allowed" although the first "and" gate is inhibited by gate 64 because the first channel 75 of the shift register delay 74 remains at a low level for one delay period. This allows time for the run relay contacts 16 to fully open and settle to their normally open condition, applying AC power to the rectifier 24 via lead 22 and to the brake contacts 28 via lead 26. The brake contact coil 56 remains unenergized during this time period. At the end of the first delay period, lead 75 goes true, satisfying gate 64, lead 78, which connects the first and second "and" gates 64, 66, now is true satisfying gate 64; this presents a true (low) level to inverter 60 which turns on the brake transistor 58 energizing the brake contact coil 56 with the stored energy from brake capacitor 52 via lead 54. Closing the brake contacts 28 allows heavy current to flow from the AC source 12 through the now open contacts of run relay 16 to the full wave rectifier 24 via leads 22, 26 and 29. Here the AC current is converted to DC pulses flowing from positive position (+) of rectifier through the limit resistor 34 to the now closed brake contacts 28 via lead 32, to one phase winding of the motor on lead 32, back on lead 30 to the third set of brake contacts 28 and to the negative position (−) of the rectifier 24 via lead 30.

The shift register delay 74 continues to circulate the run signal false until after six delay periods the first "and" gate 64 is inhibited by the signal on lead 77 inhibiting the second "and" gate 66 and inverter 60 which turns off the brake transistor 58 and the brake contacts 28 open. The delay time is set to apply the braking DC current for just the length of time required to bring the motor 20 and its inertial load to a rapid stop through the brake inverter 60 which drives the brake transistor 58. This cycle cannot be repeated until a run signal has again gone high and then back to low from the run signal source 62. The DC power to energize the brake contact 28 is stored in the brake capacitor 52 to limit the time the brake contact 28 can apply the heavy braking current. Also the charge resistor 50 is selected to limit the repetition rate of the brake cycles for protection of the motor 20.

As mentioned above, direct current to an inductive load such as to the motor 20 is difficult to control due to arcing. This is overcome by using a third pole of the brake contact 28 via leads 26 and 29 to switch the AC voltage to the bridge rectifier 24. This eliminates the arcing to a portion of the AC cycle and allows the brake contact 28 to meet UL and CSA requirements as a primary power control component.

Also, protection of the motor 20, in the case of a logic failure in which the brake contact 28 is closed, is solved by limiting the time the brake contact 28 can be closed through the use of the size of the brake capacitor 52. The charge resistor 50 and the brake capacitor 52 limit both the time and repetition rate of the braking cycles of the motor 20.

Improved reliability with reduced size and cost of the components is provided using the subject circuit 10. Also, through the use of the circuit 10 in controlling the AC and DC power, the circuit 10 meets all the requirements for various federal safety agencies.

Changes may be made in the construction and arrangement of the parts or elements of the embodiments as described herein without departing from the spirit or scope of the invention defined in the following claims.

What is claimed is:

1. A run and brake control circuit for use with a three-phase electric motor and comprising:
   first power source means for providing alternating current to the electric motor;
   a run relay connected between the first power source and the electric motor and having an open position and a closed position, current being applied to the electric motor when the run relay is energized to the closed position;
   second power source means for providing a direct current source;
   brake contact means having an open position and a closed position and connected to the electric motor for braking the electric motor when current is passed therethrough in the closed position thereof;
   rectifier means connected to the run relay and to the brake contact means for providing direct current to the brake contact means when the run relay is energized to the open position so that current for braking the electric is provided;
   means connected to the second power source means for selectively energizing the run relay to the closed and open positions;
   means connected to the second power source means for energizing the brake contact means to the closed and open positions, such means having a chargeable brake capacitor so that current from the second power source charges the brake capacitor prior to energizing the brake contact means; and
   run signal means connected to the means for energizing the run relay and connected to the means for energizing the brake contact means for providing a high and low signal for closing and opening the run relay and brake contact means.

2. The circuit as described in claim 1 further including a safety interlock switch connected between the direct current power source and the means for energizing the run relay and the brake contact.

3. The circuit of claim 1 further comprising delay means connected to the run signal for providing a time delay between when the run relay is energized into the open position and the brake contact means is energized into the closed position.

4. A run and brake control circuit for a three-phase electric motor, comprising:
   a run relay connected to the electric motor and having an open position and a closed position;
   a alternating current power source connected to the run relay so that current is applied to the electric motor when the run relay is in the closed position;
   a direct current power source;
   a brake contact connected to the electric motor and having an open position and a closed position;
   a rectifier connected to the run relay and to the brake contact so that when alternating current is applied to the rectifier with the run relay in the open position the rectifier applies direct current to the brake contact so that direct current is passed to the electric motor when the brake contact is in the closed position to brake the electric motor;
   run relay coil means connected to the direct current power source for selectively energizing the run relay to the closed position and to the open position;
   brake contact coil means connected to the direct current power source for selectively energizing the brake contact to the closed position and to the open position;

run signal means connected to the run relay coil and to the brake contact coil means for providing high and low signals for effecting selective closing and opening of the run relay and brake contact thereby;

a charge resistor; and a brake capacitor, the charge resistor and brake capacitor connected between the direct current power source and the brake contact coil means.

5. The circuit of claim 4 further comprising delay circuit means connected between the run signal means and the brake contact coil means for providing a time delay between when the run relay is in the open position and the brake contact is energized in the closed position.

* * * * *